United States Patent [19]
Sinfelt et al.

[11] 3,850,747
[45] Nov. 26, 1974

[54] HYDROCARBON CONVERSION USING AN IRIDIUM-GOLD CATALYST

[75] Inventors: John H. Sinfelt, Berkeley Heights; Allan E. Barnett, Westfield, both of N.J.

[73] Assignee: Exxon Research and Engineering Company, Linden, N.J.

[22] Filed: Nov. 1, 1971

[21] Appl. No.: 194,461

Related U.S. Application Data

[63] Continuation-in-part of Ser. No. 883,601, Dec. 9, 1969.

[52] U.S. Cl. .......... 208/139, 208/138, 252/441, 252/466 PT, 260/668 A, 260/673.5
[51] Int. Cl. ..... C10g 35/06, C07c 15/00, C07c 5/22
[58] Field of Search ........ 208/138, 139; 252/466 PT

[56] References Cited
UNITED STATES PATENTS

| | | | |
|---|---|---|---|
| 2,848,377 | 8/1958 | Webb | 196/50 |
| 2,911,357 | 11/1959 | Myers et al. | 208/138 |
| 3,487,009 | 12/1969 | Jacobson et al. | 208/138 |
| 3,507,780 | 4/1970 | Spurlock et al. | 208/138 |
| 3,507,781 | 4/1970 | Spurlock et al. | 208/138 |
| 3,534,110 | 10/1970 | Juguin et al. | 260/621 |
| 3,538,174 | 11/1970 | Brodbeck et al. | 260/668 |
| 3,554,902 | 1/1971 | Buss | 208/138 |
| 3,567,625 | 3/1971 | Sinfelt et al. | 208/138 |
| 3,578,583 | 5/1971 | Buss | 208/138 |

FOREIGN PATENTS OR APPLICATIONS

| | | |
|---|---|---|
| 747,971 | 5/1970 | Belgium |
| 762,396 | 8/1971 | Belgium |
| 1,108,361 | 6/1961 | Germany |

*Primary Examiner*—Delbert E. Gantz
*Assistant Examiner*—S. Berger
*Attorney, Agent, or Firm*—J. E. Luecke

[57] ABSTRACT

Hydrocarbon materials are converted to useful products by contacting the same at elevated temperatures with a catalyst comprising a refractory support in association with greater than 0.1 wt. % iridium, and 0.1 – 1.0 wt. % of at least one additional metal. The iridium and additional catalyst metal, preferably platinum, are present on the surface of the support in the form of highly dispersed polymetallic clusters with metal surface areas of at least 200 square meters per gram of metal. The catalyst is particularly effective for promoting naphtha reforming operations.

2 Claims, 2 Drawing Figures

3,850,747

HYDROCARBON CONVERSION USING AN IRIDIUM-GOLD CATALYST

CROSS REFERENCES TO RELATED APPLICATIONS

This application is a continuation-in-part of application Ser. No. 883,601, filed Dec. 9, 1969, in the name of John H. Sinfelt.

BACKGROUND OF THE INVENTION

1. Field of the Invention

This invention relates to supported iridium-containing catalysts and to hydrocarbon conversion processes employing said iridium-containing catalysts. More particularly, this invention relates to improved supported, polymetallic, iridium-containing hydrocarbon conversion catalysts and their use in hydrocarbon conversion opertions, in particular, naphtha reforming processes.

2. Description of the Prior Art

The existence of iridium-containing hydrocarbon conversion catalysts has been reported in the patent literature. Webb et al., in U.S. Pat. No. 2,848,377, disclose that supported iridium/platinum metal combinations are effective hydrocarbon conversion catalysts. Sinfelt et al., in U.S. Pat. No. 3,567,625, teach that combinations of iridium with Group IB metals are effective hydroforming catalysts. Koberstein, in German Pat. No. 1,108,361, teaches that supported platinum catalysts containing minor amounts of iridium can be employed to reform heavy petroleum fractions. Brodbeck, in U.S. Pat. No. 3,538,174, teaches that supported platinum/iridium compositions can be employed in the isomerization of $C_8$ alkyl aromatics. It has been disclosed in U.S. Pat. No. 3,534,110, French Pat. No. 1,567,900 and in Netherlands application No. 70,04770 that cyclohexanol and/or cyclohexanone can be dehydrogenated to phenol and that saturated hydrocarbons can be dehydrogenated to olefins by contact with a supported iridium-containing catalyst that also contains an additional alkali or alkaline earth metal component. Finally, the patentees of U.S. Pat. Nos. 3,487,009; 3,507,780; 3,507,781; 3,554,902 and 3,578,583 disclose the existence of various types of supported iridium-containing catalysts and their use in the reforming of naphtha fractions.

SUMMARY OF THE INVENTION

According to the present invention, it has been discovered that certain specific types of supported iridium-containing catalysts are highly effective for promoting the conversion of hydrocarbon materials to useful products. In particular, the iridium-containing materials, preferably, platinum-iridium-containing materials, are unusually effective naphtha reforming catalysts.

Figure 1:
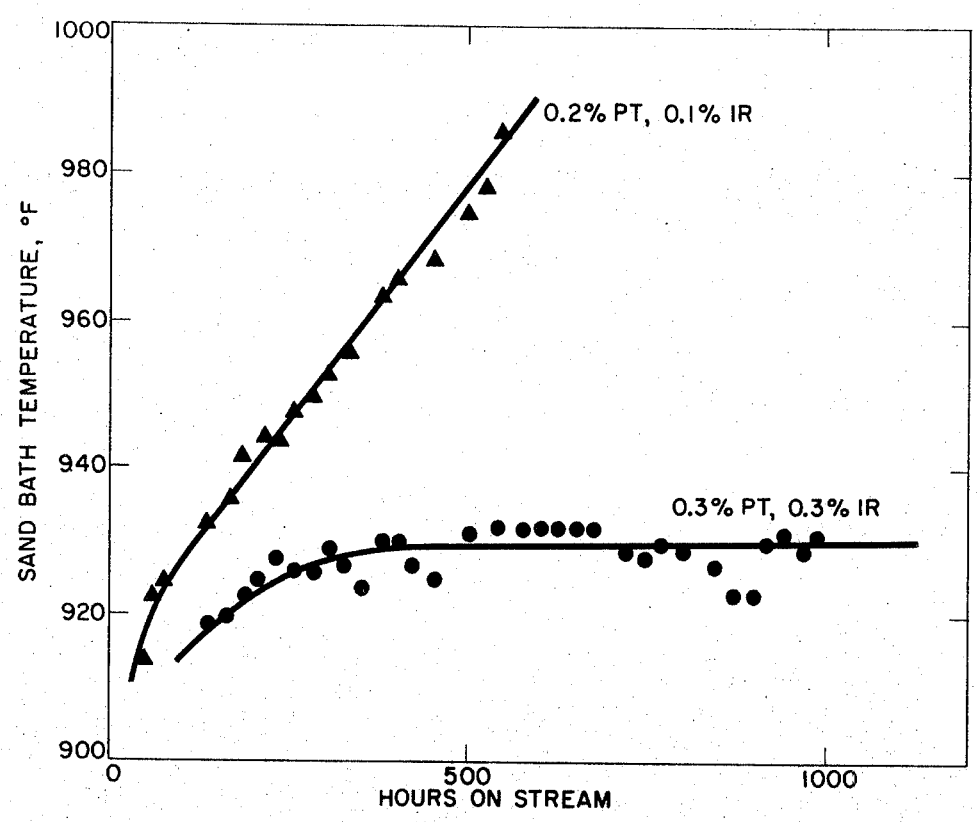
FIG. 1 is a plot of the temperature required, as a function of run length, to give a $C_5+$ reformate with a research clear octane number of 100 utilizing catalysts containing 0.1 wt. % and 0.3 wt. % iridium.

The catalyst compositions of the present invention consist of a refractory support in association with greater than 0.1 wt. % iridium, based on total catalyst, and greater than 0.1 wt. % of at least one additional metal selected from rhodium, ruthenium, palladium, osmium, platinum, copper, silver, and gold. The iridium and additional metallic component, designated as the active metallic fraction of the catalyst, are present in an atomic ratio varying from about 1:10 to about 10:1. The surface area of the active metallic fraction of the catalyst is at least 200 square meters per gram of said metallic fraction as determined by the carbon monoxide chemisorption method described by Sinfelt and Yates, J. Catalysis, 8, 82 – 90 (1967). Maximum reforming catalyst performance is obtained when the catalyst contains less than about two atoms of sulfur, preferably less than about one atom of sulfur, per atom of iridium and additional catalyst metals and when the catalyst support material is substantially free of alkali or alkaline earth metal constituents (alkali or alkaline earth metals or compounds thereof). As noted above, the catalysts of the present invention are particularly effective naphtha reforming catalysts. Applicants have discovered that supported, polymetallic, iridium-containing catalysts of the present invention, prepared in a manner which is most favorable for the formation of highly dispersed polymetallic clusters, are superior to iridium-containing catalysts prepared by procedures more likely to yield isolated crystallites of the individual metals.

It is well known that supported metal catalysts can be prepared with a degree of dispersion of the metal so high that essentially every atom of metal in the catalyst is an exposed surface atom (see, for example, J. H. Sinfelt, "Advances in Chemical Engineering," 5, 39 (1964), and J. H. Sinfelt, "Catalysis Reviews," 3(2), 177 – 182 (1969)). The nature of the dispersed metallic layer in such catalysts does not necessarily correspond to dispersion as isolated atoms separated by distances of many atomic diameters. Indeed, available evidence indicates that the metallic phase exists either as very small crystallites of the order of 10A in size, or in the form of two dimensional, incomplete monolayers ("patches") on the surface of the carrier. These localized groupings of metallic atoms will herein be designated as "clusters." When a support is coimpregnated with a solution containing compounds of two different metals, at least when the compounds have similar adsorptive properties on the support as in the case of chloroplatinic and chloroiridic acids, it is most probable that the metal clusters formed during subsequent reduction in hydrogen will consist of atoms of both catalytic metals. The catalyst is then a "dispersed bimetallic cluster." In general, catalysts formed in this way and containing two or more metal catalytic components will be designated as "dispersed polymetallic clusters." The metallic atoms which constitute the cluster would be separated by distances of about 2.5 to 4.0 Angstroms, which is very small compared to the average distance between the centers of the clusters themselves, the latter distance corresponding to a factor at least 10 times the average distance between atoms in the cluster.

The support of carrier component of the catalysts of the present invention is preferably a porous, adsorptive material having a surface area, as determined by the Brunauer-Emmett-Teller (BET) method, of from about 20 to 800, preferably 100 to 300, square meters/gram. The support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as kieselguhr, kaolin, china clay, Attapulgus clay, etc.; (b) ceramic compositions such as crushed porcelain or fire brick; (c) aluminosilicate zeolite materials such as naturally occurring or synthetic erionite, mordenite, faujasite, etc. that may or may not be previously converted to a hydrogen or ammonia form and reduced in soda content by virtue of an exchange with various metal ions, including rare earth metal cations; (d) refractory inorganic oxides, including alumina, titanium dioxide, zinc oxide, magnesia, thoria, chromia, silica-alumina, alumina-titania, silica-zirconia, alumina-chromia, etc. and (e) mixtures of one or more of the materials referred to above.

Refractory inorganic oxide materials are the preferred catalyst support materials. In general, superior results are obtained when alumina-containing compositions, in particular, the gamma or eta forms, are employed. Alumina is the preferred reforming catalyst base material. The support materials described above are known articles of commerce and can be prepared for use as catalyst constituents by many varied techniques. Typically, the support materials are used in the form of spheres, granules, powders, extrudates or pellets, etc. The precise size or shape of the support material used is dependent upon many engineering factors not within the purview of the instant invention.

Iridium and at least one additional metal selected from ruthenium, rhodium, palladium, osmium, platinum, copper, silver and gold are present on the surface of the refractory support. The preferred second metal is platinum. During use in a hydrocarbon conversion operation, the metals preferably exist on the support in a predominantly non-oxide form. Most preferably, the catalyst consists of highly dispersed, supported clusters of iridium metal and the additional metal or metals. It has been discovered that improved catalytic results are obtained when the catalyst is prepared in a manner which would be expected to favor formation of dispersed polymetallic clusters rather than separate crystallites of the individual metals.

Certain minimum amounts of iridium and additional catalyst metal must be present on the catalyst surface. This is particularly true with respect to catalysts employed in a naphtha reforming operation when the catalyst should contain greater than about 0.1 wt. % iridium, based on the dry weight of the total catalyst. Similarly, at least about 0.1 wt. % of additional catalyst metals should also be present in order to secure a naphtha reforming catalyst of maximum effectiveness. Specifically, iridium is present on the catalyst surface in amounts varying from greater than about 0.1 to about 1.0 wt. %, preferably 0.15 to 0.5 wt. %, based upon total weight of the dry catalyst. Typically, additional catalyst metals, preferably platinum, are present in the catalyst in amounts varying from about 0.1 to 1.0 wt. %, preferably 0.15 to 0.5 wt. %, based upon the dry weight of the catalyst. Iridium/platinum-containing naphtha reforming catalysts having maximum effectiveness normally contain greater than about 0.1 to 1.0, preferably greater than about 0.15 to 0.5 wt. % each, based on total catalyst, of iridium and platinum.

The atomic ratio of iridium metal to additional catalyst metals on the surface of the support may vary from about 1:10 to 10:1, preferably about 1:3 to 3:1. As noted earlier, the iridium and additional catalyst metals should be deposited on the surface of the refractory support in such a manner that the total catalyst metals present exhibit a surface area greater than about 200 square meters per gram of metal in the catalyst. Maximum metal surface area can be achieved by taking steps to insure that the iridium in the catalyst is not present in a crystalline oxide form immediately prior to reduction. It has been discovered that the effective surface area of the metal is markedly diminished if the iridium metal is converted to such an oxide form prior to reduction. A simple reduction of crystalline iridium oxide back to the iridium metal does not serve to disperse the iridium in the desired manner. Accordingly, if the iridium metal is converted to a crystalline oxide form during the course of preparation or use of the catalyst, it is necessary to redisperse the iridium to obtain the desired maximum metal surface area.

The performance of the catalyst system of the present invention is affected by the presence of sulfur or sulfur-containing materials arising from the feed stock or other sources. Accordingly, when the catalyst is employed for reforming hydrocarbons, the free and/or combined sulfur content of the catalyst should be maintained at a level less than about two atoms of sulfur, preferably less than one atom of sulfur, per atom of iridium and additional catalyst metals. The desired low catalyst sulfur levels are advantageously maintained during the predominant portion of any reforming cycle. Higher catalyst sulfur levels may be encountered during some portions of a naphtha reforming run such as during start-up or in the event of a process upset. Sulfur is removed from the catalyst by contacting the same with sulfur-free feed stock. Finally, the catalyst should be substantially free of alkali metal (Group IA) or alkaline earth metal (Group IIA) constituents (less than 0.1 wt. %), since the presence of basic components on the catalyst serves to inhibit certain reforming reactions.

The catalyst of the present invention can be prepared employing simple impregnation techniques. Specifically, the catalyst is prepared by impregnating the catalyst support material with a solution of a soluble iridium compound and a soluble compound of the additional catalyst metal. Desirably, an aqueous solution of the metal compounds is used. It is essential that the metal compounds be impregnated on the catalyst support simultaneously to maximize the desired interaction between the iridium and other metal components, and thus promote formation of a highly dispersed cluster structure in the final reduced form of the catalyst. The carrier material is impregnated with an aqueous solution of decomposable compounds of the iridium and one or more additional catalyst metals in sufficient concentration to provide the desired quantity of metal in the finished catalyst. Iridium compounds suitable for incorporation onto the carrier include, among others, chloroiridic acid, iridium tribromide, ammonium chloroiridate, iridium trichloride, ammonium chloroiridate, etc. Additional catalyst metals may be incorporated onto the support material by employing compounds such as chloroplatinic acid, ammonium chloroplatinate, platinum ammine salts, ruthenium trichloride, rhodium trichloride, rhodium nitrate, palladium chloride, palladium ammine salts, osmium trichloride, chloroosmic acid, auric chloride, chloroauric acid, silver nitrate, copper nitrate and copper chloride. The preferred catalyst manufacturing technique involves contacting a previously prepared support, such as alumina, with an aqueous solution of an iridium compound in combination with a compound of at least one additional catalyst metal selected from ruthenium, rhodium, palladium, osmium, platinum, copper, silver and gold.

Following the impregnation of the carrier with the iridium and additional metal compounds, the composite catalyst material is dried at a temperature varying from about 220° to 250°F. The catalyst may simply be dried in air at the above stated temperatures or may be dried by treating the catalyst in a flowing stream of inert gas or hydrogen. The drying step may be followed by an additional calcination step at a temperature of about 500° to 700°F. Care must be taken to avoid contacting the catalyst at temperatures in excess of about 700° to 850°F. with air or other gas of high oxygen concentration. Otherwise the iridium will be oxidized, with loss of surface area, to crystallites of iridium oxide, and the polymetallic cluster structure will not be obtained on reduction.

Additional materials may be added to the catalyst combination to promote various types of hydrocarbon conversion reactions. For example, the naphtha reforming activity of the catalyst is improved by the addition of a halogen moiety, particularly a chlorine or fluorine moiety, to the catalyst. The halogen is present in the catalyst in amounts varying from about 0.1 to about 3 wt. %, based on total dry weight of the catalyst. The halogens may be incorporated into the catalyst at any suitable stage in the catalyst manufacture, i.e., before, during, or after incorporation of the catalyst metals onto the support material. Halogen is often incorporated into the catalyst when impregnating the support with halogen-bearing metal catalyst components, such as chloroplatinic acid. Further amounts of halogen may be incorporated in the catalyst by contacting it with materials such as hydrogen fluoride, ammonium fluoride, hydrogen chloride, ammonium chloride, either prior to or subsequent to the metal impregnation step. Halogen may also be incorporated by contacting the catalyst with a gaseous stream containing the halogen, generally chlorine.

The catalyst compositions of the present invention have many varied uses. For example, the catalysts can be employed in the formation of aromatic compounds by contacting the catalyst with suitable paraffins or naphthenes at a temperature varying between about 700° to 1000°F. and a pressure of less than about 10 atmospheres in the presence of hydrogen. The catalysts of this invention can also be employed to promote the isomerization of ethylbenzene to xylenes by contacting ethylbenzene with the catalyst at a temperature varying from about 400° to 1100°F. at elevated pressures in the presence of hydrogen. The catalyst is also useful for promoting hydrogenation, hydrocracking, oxidation, polymerization, condensation and other reactions known to the art. However, the catalysts are particularly useful in naphtha reforming processes.

In a naphtha hydroforming (reforming) process, a substantially sulfur-free naphtha stream that typically contains about 20 – 80 volume % paraffins, 20 – 80 volume % naphthenes, and about 5% – 20% aromatics, and boiling at atmospheric pressure substantially between about 80° and 450°F., preferably between about 150° and 375°F., is brought into contact with the catalyst system of the present invention in the presence of hydrogen. The reactions typically take place in the vapor phase at a temperature varying from about 650° to 1000°F., preferably about 750° to 980°F. Reaction zone pressures may vary from about 1 to 50 atmospheres, preferably from about 5 to 25 atmospheres.

The naphtha feedstream is generally passed over the catalyst at space velocities varying from about 0.5 to 20 parts by weight of naphtha per hour per part by weight of catalyst (w/hr./w), preferably from about 1 to 10 w/hr./w. The hydrogen to hydrocarbon mole ratio within the reaction zone is maintained between about 0.5 and 20, preferably between about 1 and 10. During the reforming process, the hydrogen employed can be in admixture with light gaseous hydrocarbons. Since the hydroforming process produces large quantities of hydrogen, a recycle stream is employed for admission of hydrogen with the feed.

In a typical operation, the catalyst is maintained as a fixed bed within a series of adiabatically operated reactors. Specifically, the product stream from each reactor (except the last) in the reactor series is reheated prior to passage to the following reactor. As an alternate to the above-described process sequence, the catalyst may be employed in a moving bed in which the naphtha charge stock, hydrogen and catalyst are passed in parallel through the reactor, or in a fluidized system wherein the naphtha feed stock is passed upwardly through a turbulent bed of finely divided catalyst. Finally, if desired, the catalyst may be simply slurried with the charge stock and the resulting mixture conveyed to the reaction zone for further reaction.

A naphtha reforming operation involves a plurality of reactions that occur simultaneously. Specifically, the naphthene portion of the naphtha stream is dehydrogenated to the corresponding aromatic compounds, the normal paraffins are isomerized to branched chain paraffins, and various aromatic compounds are isomerized to other aromatics. The high boiling components in the naphtha stream are also hydrocracked to lower boiling components. The iridium/platinum catalyst of this invention has been found to be a particularly effective dehydrocyclization catalyst, that is, an effective catalyst for the conversion of paraffins to aromatics. Accordingly, the catalysts of the present invention, in particular the iridium/platinum catalyst, can be used very effectively in the final reactors of a reactor series to promote the conversion of paraffins to aromatics, after the naphthenes contained in the naphtha streams have been converted to aromatics with the use of a conventional reforming catalyst, such as platinum on alumina.

An outstanding feature of the instant iridium/platinum reforming catalyst is its ability to maintain its catalytic activity at commercially desirable levels for protracted periods of time. In a typical commercial semi-regenerative naphtha reforming process, reaction temperature is increased during the course of the run to maintain constant product octane level. Raising the reaction temperature is necessitated because the catalyst is continuously deactivated as coke is laid down on the catalyst. Unfortunately, the reaction temperature cannot be raised much beyond about 1000°F. before rapid catalyst deactivation commences. Therefore, as the reaction temperature approaches about 1000°F., it is necessary to regenerate or replace the catalyst. Typically, a regeneration operation consists of burning the coke deposits from the catalyst and thereafter treating the catalyst with chlorine, HCl, organic chlorides or mixtures thereof in the presence or absence of oxygen or other materials, e.g., steam, nitrogen, hydrogen sulfide, flue gas, etc.

It is desirable to increase the duration of the periods between process start-up and catalyst regeneration and/or between catalyst regenerations since valuable production time is lost when the catalyst is being regenerated. As noted above, the present platinum/iridium catalyst has unusual activity maintenance characteristics and, accordingly, needs to be regenerated very infrequently. The specific iridiumbased catalyst of this invention, in particular, iridium/platinum combinations, can be used to promote a semi-regenerative naphtha reforming operation conducted at conditions described above to obtain on-stream cycle lengths corresponding to the processing of at least about 50 barrels (42 gallons of 231 cubic inches measured at 60°F. per barrel) of naphtha feed stock per pound of catalyst to form $C_5+$ reformate product having a research clear octane number of at least 100 without incurring a $C_5+$ reformate yield loss greater than about 3 volume % for the last 95% of the reforming cycle (period between start-up and catalyst regeneration), the cycle beginning with either a fresh or freshly regenerated catalyst. More typically, the catalyst can be used to process prior to regeneration up to 60 and frequently in excess of 75 barrels of feed stock per pound of catalyst to obtain a 100+ research clear octane number product without incurring a yield loss in excess of that mentioned above.

DESCRIPTION OF THE PREFERRED EMBODIMENTS

Example 1

A catalyst containing 0.5 wt. % platinum and 0.5 wt. % iridium on alimina was prepared by coimpregnating eta alumina (identified here as Alumina A) with an aqueous solution of chloroplatinic acid ($H_2PtCl_6$) and iridium tribromide tetrahydrate ($IrBr_3 \cdot 4H_2O$). The solution contained 0.016 gm. of H2PtCl6 and 0.020 gm. of $IrBr_3 \cdot 4H_2O$ per milliliter of solution. The amount of impregnating solution used was approximately 0.65 milliliter per gram of alumina. The eta alumina was prepared by calcining beta alumina trihydrate at 1100°F. for 4 hours. The surface area of the eta alumina was approximately 300 $m^2$/gm. After impregnation of the alumina with the active catalytic components, the resulting material was dried at 230°F. The catalyst was not contacted with oxygen at elevated temperature (calcined).

Example 2

The catalyst of Example 1 was tested for the reforming of n-heptane. Approximately 3.0 grams of the catalyst was charged in the form of 10 – 20 mesh granules to an electrically heated steel tubular reactor approximately 0.5 inch in diameter. The catalyst was reduced in place in the reactor in downflowing hydrogen for 2 hours at 900°F. prior to the reforming run. The n-heptane (passed downflow) weight hourly space velocity (grams of n-heptane feed per hour per gram of catalyst) was 20, and the hydrogen to n-heptane mole ratio was 5/1. The reaction temperature and pressure were maintained at about 850°F. and 200 psig, respectively. After 30 minutes on stream, the n-heptane conversion was 83.5%, and the selectivity to aromatics (toluene + benzene) was 15.4%.

Example 3

The catalyst of Example 1 was reduced in hydrogen for 2 hours at 1472°F., and then purged with helium. It was then calcined in air for 2 hours at 1600°F. thereby converting the iridium in the catalyst to an oxide. The catalyst was then tested for its activity in n-heptane reforming at the same conditions employed in Example 2. As in Example 2, the catalyst was reduced in place in the reactor in flowing hydrogen for 2 hours at 900°F. prior to the run. After 15 minutes on stream, the n-heptane conversion was 23%, and the selectivity to aromatics (toluene + benzene) was 9.6%. After 60 minutes on stream, the conversion was 20.7%, and the selectivity to aromatics was 7.0%. Clearly, the calcination of the platinum-iridium catalyst in air decreased very markedly the activity and selectivity of the catalyst, as can be seen by comparing the data of Examples 2 and 3.

Example 4

A platinum-iridium-alumina catalyst containing 0.3 wt. % platinum and 0.3 wt. % iridium was prepared by coimpregnation of 1/16 inch alumina extrudates with an aqueous solution of chloroiridic acid ($H_2IrCl_6 \cdot nH_2O$ containing 38.5 wt. % Ir) and chloroplatinic acid ($H_2PtCl_6 \cdot nH_2O$ containing 40 wt. % Pt). The solution contained 0.0054 gm. of chloroiridic acid and 0.0052 gm. of chloroplatinic acid per milliliter of solution. Approximately 1.45 milliliters of impregnating solution was used per gram of alumina. The alumina was kept in contact with the impregnating solution overnight, during which time the chloroplatinate and chloroiridate ions were removed from the solution by the alumina. The depleted solution was then decanted from the alumina, and the latter was dried for 24 hours at 230°F. The dried material was then calcined in air at 500°F. for 4 hours. The alumina used in the preparation was a gamma alumina with a surface area of approximately 180 $m^2$/gm., and will be identified as Alumina C.

Example 5

A catalyst containing 0.3 wt. % platinum and 0.3 wt. % iridium on alumina was prepared by the method of Example 4, except that a different alumina (identified as Alumina E) was used. Alumina E is also a gamma alumina with an approximate surface area of 180 $m^2$/gm. Alumina E and Alumina C were obtained from different sources and may not be identical in all respects.

Example 6

A second platinum-iridium-alumina catalyst containing 0.2 wt. % platinum and 0.1 wt. % iridium was prepared by the method of Example 4 using Alumina C. This catalyst and the catalyst of Example 4 were then used for the reforming of a 210–340°F. boiling range mixed naphtha containing approximately 43 volume % naphthenes, 45 volume % paraffins, and the remainder aromatics.

The reactor system used consisted of an elongated steel tube of approximately one inch inside diameter and having a capacity of about 500 cubic centimeters. The reaction tube is positioned within a fluidized sand constant temperature heating bath. In each catalyst test, approximately 150 grams of catalyst diluted with low surface area ceramic beads to a volume of about 500 cubic centimeters was charged to the reactor. The naphtha feedstock and hydrogen were preheated to nominal reaction temperature (sand bath temperature) and passed upflow over the fixed catalyst bed.

The weight hourly space velocity of the naphtha was 3, and the hydrogen rate was 5000 standard cubic feet per barrel of naphtha. The reactor pressure was maintained at 200 psig. The temperature of the fluidized sand heating bath surrounding the reactor was selected to give a $C_5+$ reformate with a research clear octane number of 100. As the catalyst deactivated, the temperature was increased to maintain the desired octane number. Comparative results on the activity maintenance performance of the two catalysts are recorded in FIG. 1.

As is evident from the Figure, the activity maintenance characteristics of the catalyst containing only 0.1 wt. % iridium are clearly inferior to those of the catalyst containing 0.3 wt. % iridium as the rate of deactivation of the low iridium content catalyst is considerably higher. Accordingly, the low iridium content catalyst would have to be regenerated much more frequently than the catalyst coming within the ambit of the present invention.

Example 7

Two additional platinum-iridium-alumina catalysts containing 0.3 wt. % iridium and 0.3 wt. % platinum were prepared by the method of Example 4 using Alumina C, except that they were calcined in air at temperatures of 800° and 1100° F. instead of 500°F. The metal surface areas of these catalysts and of the catalyst of Example 4 were then determined by the carbon monoxide chemisorption method described by Sinfelt and Yates, *J. Catalysis*, 8, 82 – 90 (1967). Naphtha reforming data were also obtained on the catalysts calcined at 500 and 1100°F., using the reactor equipment of Example 2 and the same naphtha feed employed in Example 6 at a weight hourly space velocity of 20, with a hydrogen to hydrocarbon mole ratio of 5/1, at a pressure and temperature of 200 psig and 940°F. Data are summarized in the following table:

| Calcination Temperature, °F. | 500 | 800 | 1100 |
|---|---|---|---|
| Metal surface area, sq. meters per gram of metal | 235 | 235 | 88 |
| Research clear octane number* | 99.1 | — | 96.8 |

*Data obtained after 100 minutes on stream.

The data indicate that calcination in air at a temperature above about 800°F. gives a lower metal surface area and a lower catalyst activity for naphtha reforming.

Example 8

A platinum-iridium-alumina catalyst containing 0.3 wt. % platinum and 0.3 wt. % iridium was prepared by sequential impregnation rather than coimpregnation. Alumina E was first impregnated with chloroiridic acid solution using 1.5 milliliters of solution per gram of alumina. The alumina was kept in contact with the impregnating solution overnight, after which it was dried at 230°F. The dried material was then contacted with chloroplatinic acid solution for 6 hours and dried again at 230°F. The catalyst was then reduced in flowing hydrogen at 932°F. The metal surface area was determined by carbon monoxide chemisorption and compared with the metal surface area of the catalyst of Example 5:

| Catalyst | Metal Surface Area, $m^2/gm$ |
|---|---|
| Sequentially impregnated Pt-Ir | 160 |
| Coimpregnated Pt-Ir | 235 |

The coimpregnated platinum-iridium catalyst has a significantly higher metal surface area than the sequentially impregnated platinum-iridium catalyst. Since reforming catalyst activity is directly related to the metals surface area of the catalyst, use of the coimpregnation method will lead to obtaining improved catalysts.

Example 9

Two platinum-iridium-silica catalysts containing 0.6 wt. % platinum and 0.1 wt. % iridium were prepared using Davison 922 silica gel as the support. The first catalyst was prepared by coimpregnation of the active components on the silica from a solution of chloroplatinic and chloroiridic acids. The second catalyst was prepared by sequential impregnation of the active components, the silica being impregnated first with chloroplatinic acid, then dried at 230°F., followed by impregnation with chloroiridic acid, a second drying at 230°F. and a final calcination at 850°F. The catalysts were then evaluated for the reforming of n-heptane utilizing the Example 2 apparatus at 1 atm. pressure, 925°F., a hydrogen to n-heptane mole ratio of 5/1, and a weight hourly space velocity of 5. Comparative data are shown in the following table:

| Catalyst | % Conversion of $nC_7$* | % Selectivity to Benzene and Toluene* |
|---|---|---|
| Sequentially impregnated Pt-Ir | 48.4 | 53.4 |
| Coimpregnated Pt-Ir | 60.8 | 61.0 |

*Data obtained after 2 hours on stream.

The coimpregnated catalyst is more active than the sequentially impregnated catalyst, and more selective for aromatics formation.

Example 10

Two iridium-gold-alumina catalysts were prepared by coimpregnating alumina with an aqueous solution of chloroiridic acid and $HAuCl_4 \cdot 3H_2O$. Prior to impregnation, the alumina (an eta alumina) was heated at 1600°F. for 24 hours. The surface area of the alumina after this treatment was approximately 80 $m^2/gm$. Approximately 0.65 milliliter of impregnating solution was employed per gram of alumina. The impregnated alumina was then dried at 230°F. Part of this material was calcined in air for 1 hour at 1000°F., while the remainder was not calcined at all. Both the calcined and non-calcined materials were then pelleted to form ⅛ inch cylinders. The two catalysts were then compared for the reforming of a 200–325°F. mixed Louisiana naphtha in the Example 2 apparatus at a weight hourly space velocity of 6, a hydrogen to hydrocarbon mole ratio of 5/1, and at a temperature and pressure of 940°F. and 200 psig, respectively. Data are shown in the following table:

| Catalyst | Average Research Clear Octane Number* |
|---|---|
| Ir-Au non-calcined | 98.8 |
| Ir-Au calcined | 90.5 |

*During the three hour period from hour 1 to hour 4 on stream.

Calcination of the Ir-Au catalyst in air at 1000°F. clearly decreases the reforming activity.

Example 11

A series of tests was conducted to demonstrate the superior activity maintenance characteristics of the iridium-platinum catalysts of this invention versus commercially employed platinum-alumina (American Cyanamid PHF-4) and platinum-rhenium-alumina (American Cyanamid PR-6) reforming catalysts. The platinum-iridium catalyst tested was the 0.3 wt. % platinum/0.3 wt. % iridium catalyst of Example 4. The platinum-alumina catalyst contained 0.3 wt. % platinum and the platinum-rhenium-alumina catalyst contained 0.3 wt. % platinum and 0.3 wt. % rhenium. All of the comparative tests were conducted utilizing the equipment, feed stock and procedure of Example 6.

Figure 2:
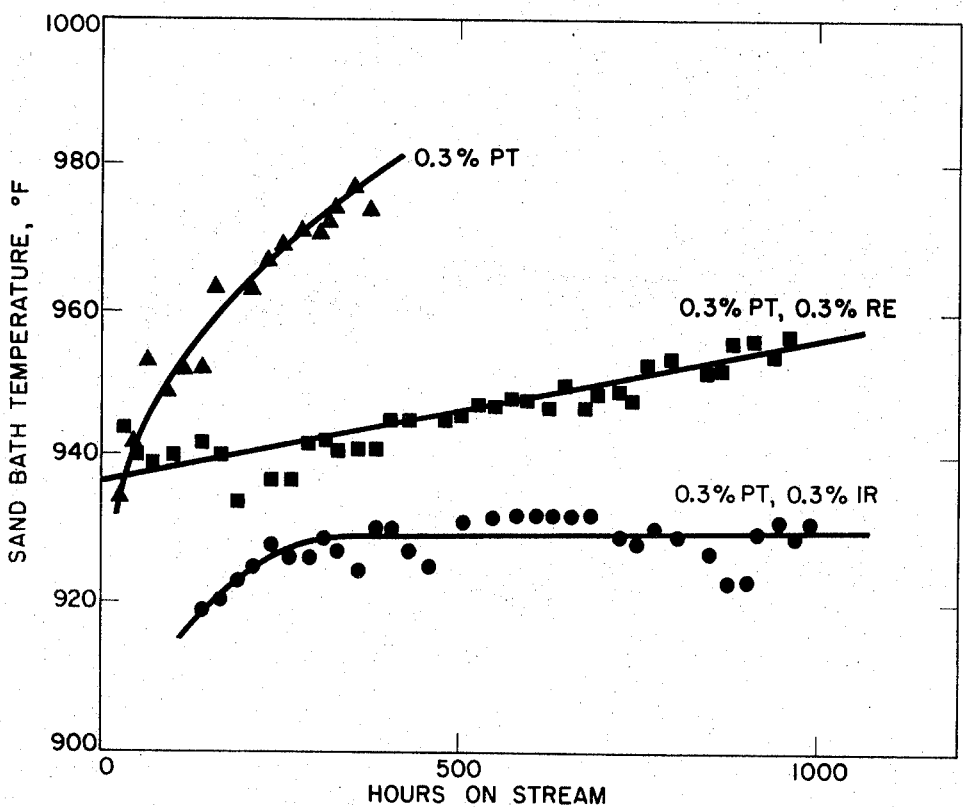
FIG. 2 is a graph of the temperature required, as a function of run length, to give a $C_5+$ reformate with a research clear octane number of 100 utilizing various noble metal-alumina reforming catalyst combinations.

A portion of the test results is recorded in FIG. 2. The FIG. 2 data clearly demonstrate that the present iridium-platinum-alumina catalyst has markedly superior reforming activity maintenance characteristics in comparison with widely used platinum or platinum-rhenium based catalysts.

What is claimed is:

1. A hydrocarbon conversion process which comprises contacting a hydrocarbon material, under conversion conditions, with a catalyst comprising a refractory support in association with greater than 0.1 wt. % iridium, based on total catalyst, and 0.1 to 1.0 wt. % of gold, based on total catalyst, said iridium and gold being present on said refractory support in an atomic ratio varying from 1:10 to 10:1, the surface area of said iridium and gold on said support being at least 200 square meters per gram of said iridium and gold as determined by carbon monoxide chemisorption techniques, said catalyst containing less than about two atoms of sulfur per atom of iridium and gold and being substantially free of alkali and alkaline earth metal constituents.

2. A process for reforming a naphtha feed stock containing aromatic, naphthenic and paraffinic constituents which comprises contacting said feed stock at a temperature varying from 650° to 1000°F. and at a pressure varying from 1 to 50 atmospheres in the presence of hydrogen with a catalyst comprising a refractory support in association with greater than 0.1 wt. % iridium, based on total catalyst, and 0.1 to 1.0 wt. % of gold, based on total catalyst, said iridium and gold being present on said refractory support in an atomic ratio varying from 1:10 to 10:1, the surface area of said iridium and gold on said support being at least about 200 square meters per gram of said iridium and gold as determined by carbon monoxide chemisorption techniques, said catalyst containing from about 0.1 to 3.0 wt. % of a halogen moiety and less than about two atoms of sulfur per atom of iridium and additional catalyst metal and being substantially free of alkali and alkaline earth metal constituents.

* * * * *